C. M. FOSTER.
CHASSIS CONSTRUCTION FOR MOTOR VEHICLES.
APPLICATION FILED FEB. 5, 1918.
1,290,958. Patented Jan. 14, 1919.
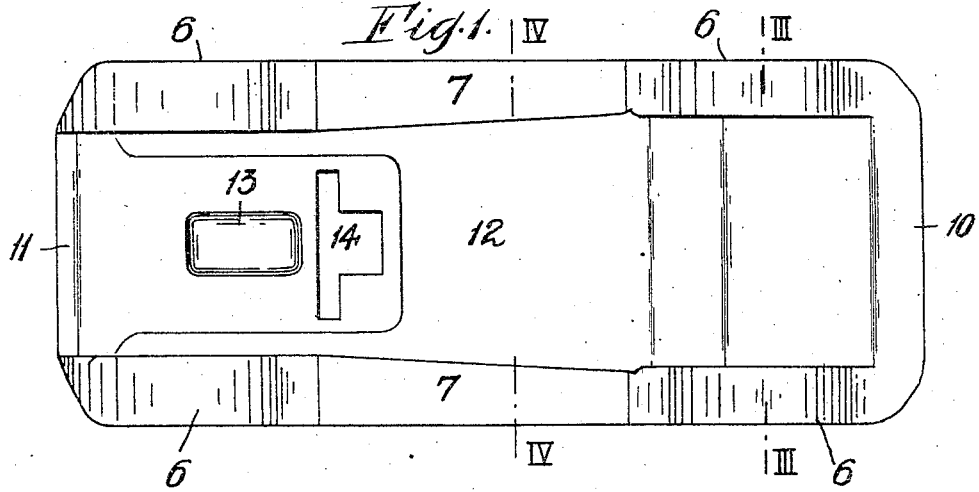
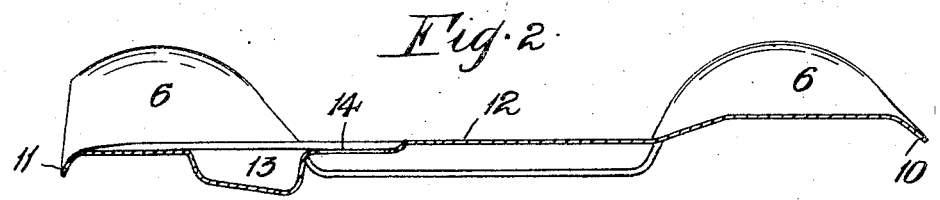
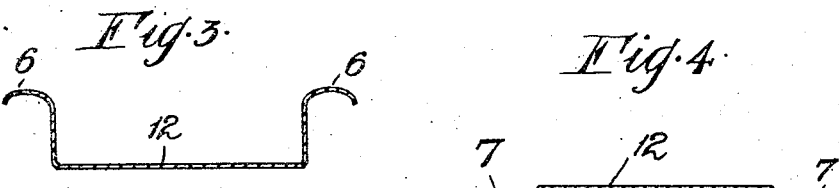
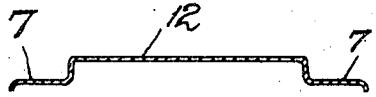
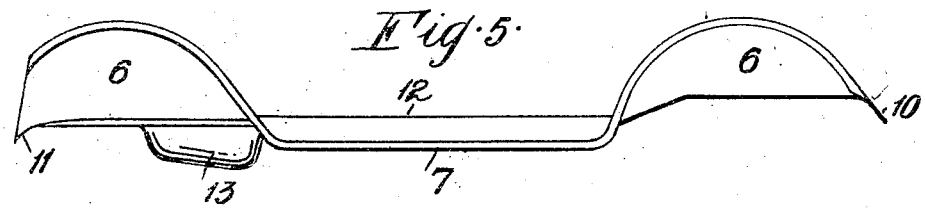
Inventor
Charles Marshall Foster
By Henry Orth Jr.

UNITED STATES PATENT OFFICE.

CHARLES MARSHALL FOSTER, OF HOBART, TASMANIA, AUSTRALIA.

CHASSIS CONSTRUCTION FOR MOTOR-VEHICLES.

1,290,958.     Specification of Letters Patent.     Patented Jan. 14, 1919.

Application filed February 5, 1918. Serial No. 215,483.

*To all whom it may concern:*

Be it known that I, CHARLES MARSHALL FOSTER, a subject of the King of Great Britain, and resident of 150 Collins street, Hobart, in the State of Tasmania, Commonwealth of Australia, motor-garage proprietor, have invented Chassis Construction for Motor-Vehicles, of which the following is a specification.

The chassis of the usual type of motor driven vehicle as at present constructed is formed of a multiplicity of parts, being frame rails and members of sheet plate, to which the running boards, mud guards and other parts are fastened with rivets and bolts to form the complete unit. On one double seated passenger car of well known make the applicant has enumerated no less than one hundred and eighty separate pieces which require to be secured or held together. It is evident that with vibration, a chassis so constructed sets up rattling consequent upon the working loose of the parts through loosening of rivets and slackening of nuts.

The object of the present invention is to practically eliminate the whole of the separate parts of the chassis and to provide a chassis of lighter, cheaper and infinitely neater construction.

Referring to the accompanying drawings which depict a practical application of my invention—

Figure 1 is a top plan of a chassis arranged in accordance with these improvements, Figs. 2 and 5 being a longitudinal section and side elevation respectively of the same.

Figs. 3 and 4 are transverse sections on lines III—III and IV—IV respectively.

In the construction shown the mud guards 6 are integral with the running boards 7 the outer ends of the guards at the rear being extended downwardly and rearwardly beyond their usual length to form a flat portion 10 to which the outer ends of the usual vehicle springs will be secured by any suitable means the ends of said guards being disposed at a point where, in the present form of construction, the ends of the dumb irons would terminate. A similar flat portion 11 is provided between the front ends of the front mud guards. The central portion of the chassis is formed in one piece 12 preferably integral with said guards and running boards shaped and provided with orifices and depressions to suit requirements. For instance the depression 13 will form a casing for the engine crank case and the T shaped orifice 14 is provided for the fly wheel and gear case. The whole unit constitutes a complete chassis which may be produced very cheaply and when formed of selected sheet steel will constitute a rigid structure. The outer edges of the chassis are preferably slightly rolled for the purpose of imparting rigidity at the edges.

It is to be understood that the invention is not restricted to the exact arrangement illustrated as it may be varied to suit cars having varying lengths of wheel base and mud guard arrangements.

What I claim and desire to secure by Letters Patent is:—

A chassis for motor cars made of a single piece of sheet metal consisting of a central frame portion, mud guards, and a running board on each longitudinal side of the frame between the mud guards.

CHARLES MARSHALL FOSTER.